US008916017B2

(12) United States Patent
Natarajan et al.

(10) Patent No.: US 8,916,017 B2
(45) Date of Patent: Dec. 23, 2014

(54) GLASS SHEET LAMINATING SYSTEM

(75) Inventors: Govindarajan Natarajan, Poughkeepsie, NY (US); Nathaniel David Wetmore, Elmira, NY (US)

(73) Assignee: Corning Incorporated, Corning, NY (US)

( * ) Notice: Subject to any disclaimer, the term of this patent is extended or adjusted under 35 U.S.C. 154(b) by 168 days.

(21) Appl. No.: 13/456,516

(22) Filed: Apr. 26, 2012

(65) Prior Publication Data
US 2013/0284351 A1 Oct. 31, 2013

(51) Int. Cl.
*B29C 65/00* (2006.01)
*B32B 37/00* (2006.01)
*B32B 17/00* (2006.01)
*B32B 17/10* (2006.01)
*C03C 27/00* (2006.01)
*G02C 7/00* (2006.01)
*B60J 1/00* (2006.01)
*E06B 3/00* (2006.01)
*E06B 5/00* (2006.01)
*E06B 7/00* (2006.01)
*E06B 3/24* (2006.01)

(52) U.S. Cl.
USPC ............. 156/285; 156/286; 156/99; 156/100; 156/101; 156/102; 156/103; 156/104; 156/105; 156/106; 156/107; 156/108; 156/109; 156/382

(58) Field of Classification Search
CPC .......... C03C 27/00; G02C 7/00; B29C 65/00; B29C 65/48; B29C 65/4805; B29C 65/4815; B29C 65/50; B29C 65/5035; B29C 65/70; B29C 65/78; B29C 66/00145; B29C 66/344; B29C 66/345; B29C 66/41; B29C 66/43; B29C 66/45; B29C 66/47; B29C 66/70; B29C 66/72326; B32B 37/00; B32B 17/00; B32B 17/10; B32B 17/06; B32B 17/063; B32B 17/066; B32B 17/10018; B32B 17/10807; B32B 17/10816; B32B 17/10825; B32B 17/10862; B32B 17/10889
USPC ............................ 156/285, 286, 99–109, 382
See application file for complete search history.

(56) References Cited

U.S. PATENT DOCUMENTS 5,082,515 A 1/1992 Cartier et al. ................. 156/212
5,264,058 A * 11/1993 Hoagland et al. ............... 156/99
(Continued)

FOREIGN PATENT DOCUMENTS

CA 982618 1/1976
DE 10 2007 003 173 6/2008
(Continued)

*Primary Examiner* — Richard Crispino
*Assistant Examiner* — Matthew Hoover
(74) *Attorney, Agent, or Firm* — Michael W Russell

(57) ABSTRACT

A contoured glass sheet laminating system may include a glass-side vacuum bed, a laminate-side vacuum bed and a lamination actuator. The glass-side vacuum bed may include a vacuum backside and a mold-receiving side and may have sufficient permeability to permit a vacuum system to pull a vacuum across a thickness of the glass-side vacuum bed between the vacuum backside and the mold-receiving side of the glass-side vacuum bed. The laminate-side vacuum bed may include a vacuum backside and a thin-film loading side and may have sufficient permeability to permit a vacuum system to pull a vacuum across a thickness of the laminate-side vacuum bed between the vacuum backside and the thin-film loading side of the of the laminate-side vacuum bed.

22 Claims, 3 Drawing Sheets

(56) References Cited

U.S. PATENT DOCUMENTS

| | | |
|---|---|---|
| 7,638,011 B2 | 12/2009 | Bolognese |
| 2003/0173035 A1* | 9/2003 | Yamaguchi .................. 156/580 |
| 2004/0095546 A1* | 5/2004 | Lee et al. ..................... 349/187 |

FOREIGN PATENT DOCUMENTS

| | | |
|---|---|---|
| EP | 0 316 224 | 5/1989 |
| EP | 1636025 | 4/2011 |
| GB | 2 109 716 | 6/1983 |

* cited by examiner

GLASS SHEET LAMINATING SYSTEM

BACKGROUND

1. Field

The present disclosure relates to the fabrication of laminated glass sheets.

2. Technical Background

Laminated glass sheets may be used as a component in the fabrication of various electronic devices, including as cover glass for televisions, as embedded touch laminates for smart interactive applications and other displays. Laminated glass sheets may offer advantages over non-laminated glass sheets in optical quality, performance and mechanical durability. Some electronics require specialty shape laminated glass sheets, such as laminated glass sheets with curved, shaped, bezeled, beveled, or otherwise contoured profiles. Accordingly, there is a need for improved devices and processes for laminating glass sheets that can be used for conventional and specialty glass shapes.

BRIEF SUMMARY

The concepts of the present disclosure are generally applicable to laminated glass sheets with curved, shaped, bezeled, beveled, or otherwise contoured profiles, as well as substantially flat, non-contoured laminated glass sheets. In accordance with one embodiment of the present disclosure, a contoured glass sheet laminating system may comprise a glass-side vacuum bed, a laminate-side vacuum bed and a lamination actuator. The glass-side vacuum bed may comprise a vacuum backside and a mold-receiving side and may have sufficient permeability to permit a vacuum system to pull a vacuum across a thickness of the glass-side vacuum bed between the vacuum backside and the mold-receiving side of the glass-side vacuum bed. The laminate-side vacuum bed may comprise a vacuum backside and a thin-film loading side and may have sufficient permeability to permit a vacuum system to pull a vacuum across a thickness of the laminate-side vacuum bed between the vacuum backside and the thin-film loading side of the of the laminate-side vacuum bed. The lamination actuator may be positioned to operatively engage the vacuum backside of the laminate-side vacuum bed and may be operative to move laterally and vertically relative to the glass-side vacuum bed and the laminate-side vacuum bed. The laminate-side vacuum bed may be sufficiently flexible to at least partially conform to the shape of a contoured glass sheet held by a glass-side contoured mold in contact with the mold-receiving side of the glass-side vacuum bed when loaded with a thin-film lamination package and operatively engaged by the lamination actuator. The lamination actuator may be further operative to at least partially release, or complement the at least partial release of, the vacuum pulled across the laminate-side vacuum bed as the lamination actuator moves laterally relative to the laminate-side vacuum bed.

In accordance with another embodiment of the present disclosure, a method for laminating a glass sheet may utilize a system that includes a glass-side vacuum bed, a mold, a laminate-side vacuum bed, and a lamination actuator. The glass-side vacuum bed may comprise a vacuum backside and a mold-receiving side, the laminate-side vacuum bed may comprise a vacuum backside and a thin-film loading side, and the mold may be in contact with the mold-receiving side of the glass-side vacuum bed. The method may comprise loading the mold with a glass sheet; loading the laminate-side vacuum bed with a thin-film lamination package; pulling a vacuum across a thickness of the glass-side vacuum bed between the vacuum backside and the mold-receiving side of the glass-side vacuum bed; pulling a vacuum across a thickness of the laminate-side vacuum bed between the vacuum backside and the thin-film loading side of the of the laminate-side vacuum bed; operatively engaging the vacuum backside of the laminate-side vacuum bed with the lamination actuator; moving the lamination actuator laterally and vertically relative to the laminate-side vacuum bed loaded with the thin-film lamination package to contact the glass sheet with the thin-film lamination package and force the laminate-side vacuum bed to at least partially conform to the shape of the glass sheet; and at least partially releasing the vacuum pulled across the laminate-side vacuum bed as the lamination actuator moves laterally relative to the laminate-side vacuum bed.

In accordance with another embodiment of the present disclosure, a sheet laminating system may comprise an object-side vacuum bed, a laminate-side vacuum bed and a lamination actuator. The object-side vacuum bed may comprise a vacuum backside and a mold-receiving side and may have sufficient permeability to permit a vacuum system to pull a vacuum across a thickness of the object-side vacuum bed between the vacuum backside and the mold-receiving side of the object-side vacuum bed. The laminate-side vacuum bed may comprise a vacuum backside and a thin-film loading side and may have sufficient permeability to permit a vacuum system to pull a vacuum across a thickness of the laminate-side vacuum bed between the vacuum backside and the thin-film loading side of the of the laminate-side vacuum bed. The lamination actuator may be positioned to operatively engage the vacuum backside of the laminate-side vacuum bed and may be operative to move laterally and vertically relative to the object-side vacuum bed and the laminate-side vacuum bed. The laminate-side vacuum bed may be sufficiently flexible to at least partially conform to the shape of a sheet held by a mold in contact with the mold-receiving side of the object-side vacuum bed when loaded with a thin-film lamination package and operatively engaged by the lamination actuator. The lamination actuator may be further operative to release, or complement the release of, the vacuum pulled across the laminate-side vacuum bed as the lamination actuator moves laterally relative to the laminate-side vacuum bed.

In accordance with another embodiment of the present disclosure, a contoured glass sheet laminating system may comprise a glass-side vacuum bed, a laminate-side bed, a glass-side contoured mold, a laminate-side compliant mold, and a lamination actuator. The glass-side vacuum bed may comprise a vacuum backside and a mold-receiving side and may have sufficient permeability to permit a vacuum system to pull a vacuum across a thickness of the glass-side vacuum bed between the vacuum backside and the mold-receiving side of the glass-side vacuum bed. The laminate-side bed may comprise a backside and a thin-film loading side. The lamination actuator may be operative to move the laminate-side bed vertically relative to the glass-side vacuum bed. The glass-side contoured mold may be positioned on the mold-receiving side of the glass-side vacuum bed.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
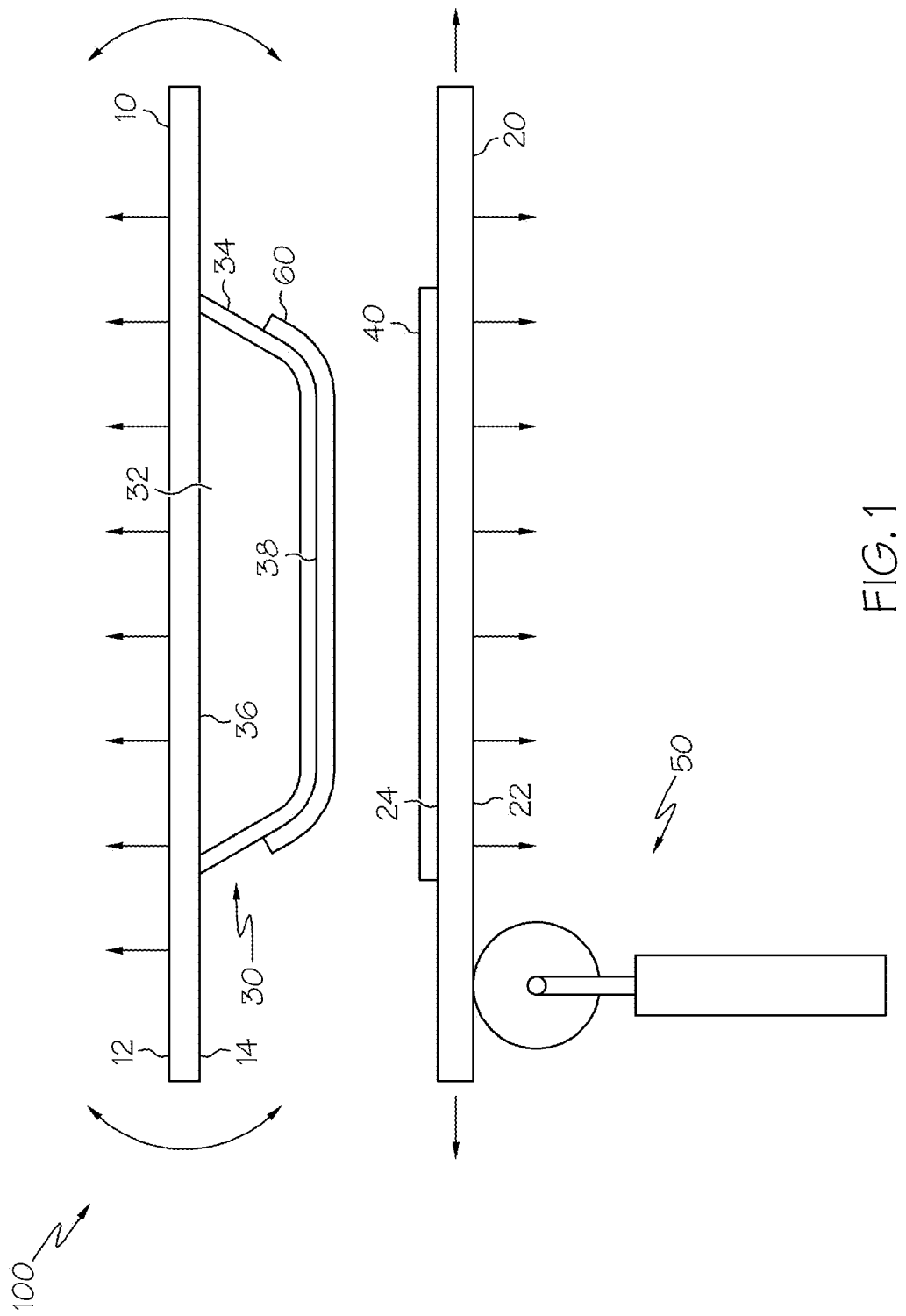
FIG. 1 is a schematic cross section illustrating a glass sheet laminating system prior to lamination of a glass sheet.
Figure 2:
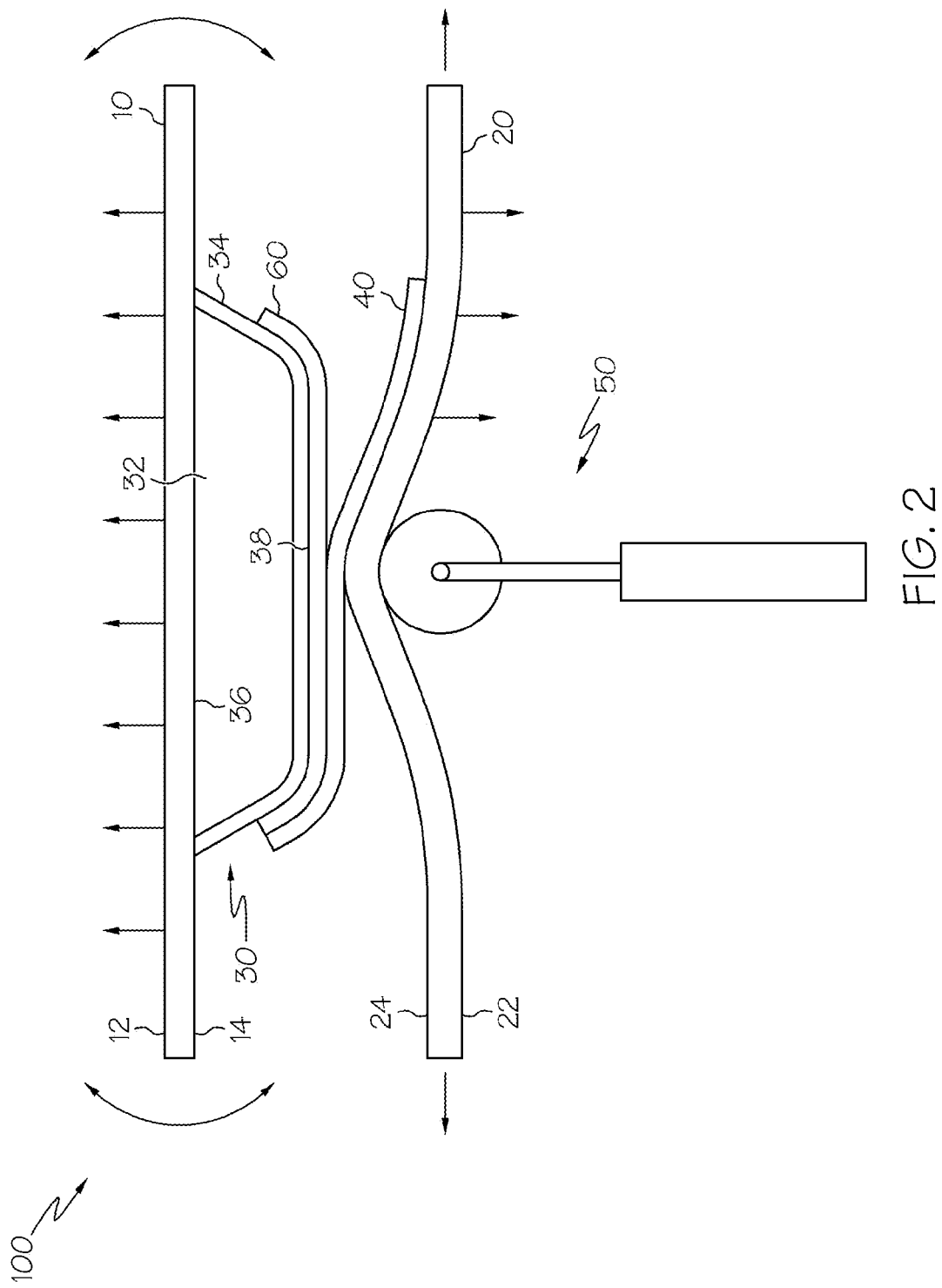
FIG. 2 is a schematic cross section illustrating a glass sheet laminating system wherein a lamination package is being applied to a glass sheet.

Referring to FIGS. 1 and 2, a glass sheet laminating system 100 according to the present disclosure generally comprises a glass-side vacuum bed 10, a laminate-side vacuum bed 20, and a lamination actuator 50. The glass sheet laminating system 100 is typically put into operation with an accompanying glass-side contoured mold 30 and a flexible thin-film lamination package 40.

In one embodiment, the glass-side vacuum bed 10 comprises a vacuum backside 12 and a mold-receiving side 14. A thickness of the glass-side vacuum bed 10 is defined as the distance between the vacuum backside 12 and the mold-receiving side 14 of the glass-side vacuum bed 10. In one embodiment, the glass-side vacuum bed 10 may comprise a permeable material, such as a micro-porous cellular material. The glass-side vacuum bed 10 may be sufficiently permeable to permit a vacuum system positioned, for example, on the vacuum backside 12 of the glass-side vacuum bed 10 to pull a vacuum across a thickness of the glass-side vacuum bed 10. For example, and not by way of limitation, the glass-side vacuum bed 10 may be constructed of a micro-porous cellular high-elongation elastomer and may be held under lateral tension. The vacuum system, which is merely illustrated schematically by the vertical directional indicators in FIGS. 1 and 2, may be any conventional or yet-to-be developed pump, fan, or other device capable of pulling a vacuum across the glass-side vacuum bed 10 and may be positioned on the vacuum backside 12 of the glass-side vacuum bed 10.

It should be understood that as used herein, the terms "lateral" and "laterally" refers to any direction on the plane that is orthogonal to a line drawn through the thickness of the glass-side vacuum bed 10, as depicted in FIG. 1 (i.e. a line that is positioned upward and downward). For example, the vertical direction in FIG. 1 corresponds to the upward and downward directions, and the lateral direction may be any direction orthogonal to a line in the vertical direction. In one embodiment, for example, the lateral direction could refer to both a machine direction, such as the direction that a roller would move, and a non-machine direction that is on the plane orthogonal to a vertically drawn line.

In one embodiment, the glass sheet laminating system 100 comprises a glass-side contoured mold 30 that may comprise a compliant permeable material, such as a micro-porous material. The glass-side contoured mold 30 may have a glass-receiving surface 38 and a vacuum bed receiving surface 36, wherein the glass-side contoured mold 30 may be in contact with the mold-receiving side 14 of the glass-side vacuum bed 10 at the vacuum bed receiving surface 36 of the glass-side contoured mold 30. In one embodiment, the vacuum bed receiving surface 36 is substantially planar, to complement a substantially planar mold-receiving side 14 of the glass-side vacuum bed 10. The glass-receiving surface 38 of the glass-side contoured mold 30 may be shaped to complement the shape of a glass sheet 60, such as a bezeled-edge glass sheet or beveled-edge glass sheet. The glass-side contoured mold 30 may be only partially permeable, such that some sections of the glass-side contoured mold 30 are permeable and other sections are not, or alternatively may have sections that are more permeable than other sections.

In one embodiment, the glass-side contoured mold 30 comprises a mold body 32 and an elastomeric sheath 34. The mold body 32 may be in contact with the glass-side vacuum bed 10 and the elastomeric sheath 34 may at least partially cover the mold body 32. The elastomeric sheath 34 may be contacted by a glass sheet 60. The mold body 32 may comprise a material that is harder than the material of the elastomeric sheath 34. The elastomeric sheath 34 may comprise a micro-porous material, and may have higher compressible response than the material of the mold body 32. In one embodiment, the surface of the elastomeric sheath 34 conforms to the shape of the mold body 32 and has the shape of a surface of a contoured glass sheet 60, such as a bezeled-edge glass sheet or beveled-edge glass sheet.

In one embodiment, the glass-side vacuum bed 10 may be mounted to a pivoting frame that is configured to enable the glass-side vacuum bed 10 to be flipped about a lateral axis of the glass-side vacuum bed 10. The pivoting frame is merely illustrated schematically in FIGS. 1 and 2 by rotational directional indicators because the particular design of the frame can be developed by those familiar with the art of mechanical positioning and, as such, is beyond the scope of the present disclosure. For example, the pivoting frame may allow a glass sheet 60 to be loaded onto the top the glass-side contoured mold 30 and be later flipped into a position wherein the glass sheet 60 is positioned below the glass-side contoured mold 30 and held in place under vacuum.

Still referring to FIGS. 1 and 2, the laminate-side vacuum bed 20 comprises a vacuum backside 22 and a thin-film loading side 24. A thickness of the laminate-side vacuum bed 20 is defined as the distance between the vacuum backside 22 and the thin-film loading side 24 of the laminate-side vacuum bed 20. In one embodiment, the laminate-side vacuum bed 20 may comprise a permeable material, such as a micro-porous cellular material. The laminate-side vacuum bed 20 may be sufficiently permeable to permit a vacuum system positioned, for example, on the vacuum backside 22 of the laminate-side vacuum bed 20 to pull a vacuum across a thickness of the laminate-side vacuum bed 20. Like the glass-side vacuum bed 10, the laminate-side vacuum bed 20 may be constructed of a micro-porous cellular high-elongation elastomer and may be held under lateral tension.

As is noted above, the laminate-side vacuum bed 20 may comprise a high-elongation material and may be held under lateral tension. In one embodiment, the laminate-side vacuum bed 20 is held under controllable lateral tension by a radial adjustment unit, which is merely illustrated schematically in FIGS. 1 and 2 by lateral directional indicators because the particular design of the radial adjustment unit can be developed by those familiar with the art of mechanical tensioning and, as such, is beyond the scope of the present disclosure.

The laminate-side vacuum bed 20 is sufficiently flexible to at least partially conform to the shape of a loaded glass sheet 60. More specifically, the laminate-side vacuum bed 20 conforms to the shape of a glass sheet 60 held by the glass-side contoured mold 30 in contact with the mold-receiving side of the glass-side vacuum bed 10. In embodiments, the glass sheet 60 may be a thermally tempered or a chemically tempered glass sheet.

The glass sheet laminating system 100 comprises a lamination actuator 50 which may be a mechanical device that can operatively engage the vacuum backside 22 of the laminate-side vacuum bed 20. For the purposes of defining and describing the subject matter of the present disclosure, it is noted that reference herein to "operative engagement" includes direct and indirect engagement. For example, in the context of the lamination actuator 50, it is contemplated that the actuator may directly or indirectly engage the vacuum backside 22 of the laminate-side vacuum bed 20.

In one embodiment, the lamination actuator 50 is a roller that is operatively connected to one or more pneumatic cylinders and/or motors. The lamination actuator 50 may be operative to move laterally and vertically relative to the glass-side vacuum bed 10 and the laminate-side vacuum bed 20. The lamination actuator 50 may be able to follow a path in the lateral and vertical directions that traces the shape of a glass sheet 60 that is in contact with the glass-side contoured mold 30. For example, where the lamination actuator 50 comprises a roller that is operatively connected to a pneumatic cylinder that controls the vertical movement of the roller, the lamination actuator 50 may be configured to apply a determined vertical pressure upon the vacuum backside 22 of the laminate-side vacuum bed 20. The lamination actuator 50 may be operatively connected to a motor which drives the lamination actuator 50 laterally across a track, such as from left to right in FIGS. 1 and 2. The actuator may be a non-contact actuator system that includes, but is not limited to, bellows-type which are primarily fluid manipulated systems.

Referring to FIGS. 1 and 2, in one embodiment, the glass sheet 60 is held in contact with the glass-side contoured mold 30, which is held in contact with the glass-side vacuum bed 10 through vacuum pressure. The glass-side contoured mold 30 may be held in contact with the glass-side vacuum bed 10 by pulling a vacuum across the thickness of the glass-side vacuum bed 10 between the vacuum backside 12 and the mold-receiving side 14 of the glass-side vacuum bed 10. A glass sheet 60 may be held in contact with the glass-receiving surface 38 of the glass-side contoured mold 30 by vacuum pressure that is transferred through the micro-porous material of the glass-side contoured mold 30. The glass-receiving surface 38 of the glass-side contoured mold 30 is shaped to complement the contour of the glass sheet 60. In one embodiment, the glass sheet 60 may have a bezeled-edge shape or beveled-edge shape, although substantially flat glass sheets with curved edges or otherwise contoured profiles are also contemplated. The contoured shape of the glass-side contoured mold 30 allows for sufficient pressure to hold the glass sheet 60 in contact with the glass-side contoured mold 30 through vacuum pressure while the glass sheet 60 is positioned under the glass-side contoured mold 30.

It is contemplated that the glass sheet 60 need not be contoured. In which case, for example, a substantially flat, non-contoured glass sheet may be held in contact with a substantially planar mold or directly with a substantially planar glass-side vacuum bed 10.

It should be understood that while the embodiments described herein relate to laminating a glass sheet 60, the lamination process could take place onto any surface of any substrate, such as, but not limited to, other glass or ceramic products, films, polymers, metals or composites.

The flexible thin-film lamination package 40 is positioned on the thin-film loading side 24 of the laminate-side vacuum bed 20. In one embodiment, the flexible thin-film lamination package 40 may comprise an optical polymer film, a pressure sensitive adhesive, an optical enhancing material, slim-glass, decorated or printed film, thin optically clear adhesive, electronic or biological functionalized layer or layers, and combinations thereof. The optical polymer film may comprise at least one of PET film, TAC film, and polycarbonate film. The optical enhancing material may comprise at least one of an anti-reflective layer, an anti-glare layer, a protective layer, a touch functional layer, an electronic functionalized layer, or combinations thereof. The lamination package 40 may comprise an electrically conductive layer. The electrically conductive layer can be patterned, screened, or printed to satisfy particular product requirements, the details of which are beyond the scope of the present disclosure. In some embodiment, the adhesive may comprise acrylic adhesives, silicone adhesives, PVB, PMMA, Sentryglas (commercially available from DuPont), or combinations thereof.

The lamination package 40 may be held in contact with the laminate-side vacuum bed 20 by the vacuum across the thickness of the laminate-side vacuum bed 20 between the vacuum backside 22 and the thin-film loading side of the laminate-side vacuum bed 20. The radial adjustment unit described above can be used to place the laminate-side vacuum bed 20 and the lamination package 40 under controlled lateral tension. For example, the lamination package 40 may be loaded on the laminate-side vacuum bed 20 under vacuum pressure and the radial adjustment unit may then be used to place the laminate-side vacuum bed 20 and the lamination package 40 under lateral tension. Although the particular degree of suitable lateral tension will vary depending upon the properties of the lamination package 40 and the laminate-side vacuum bed 20, it is generally contemplated that suitable tension will help in adjusting radial deviations up to at least 1 mm.

In one embodiment, the lateral tension of the glass-side vacuum bed 10 and/or the laminate-side vacuum bed 20 is controlled by a control system that may precisely manipulate the radial tension of the glass-side vacuum bed 10 and/or laminate-side vacuum bed 20.

In operation, methods of laminating glass sheets according to the present disclosure generally involve loading the mold that is held in contact with the mold-receiving side of the glass-side vacuum bed with a glass sheet, loading the laminate-side vacuum bed 20 with a thin-film lamination package 40, pulling a vacuum across a thickness of the glass-side vacuum bed 10 pulling a vacuum across a thickness of the laminate-side vacuum bed 20, operatively engaging the vacuum backside 22 of the laminate-side vacuum bed 20 with the lamination actuator 50, moving the lamination actuator 50 laterally and vertically relative to the laminate-side vacuum bed 20 loaded with the thin-film lamination package 40 to contact the glass sheet 60 with the thin-film lamination package 40 and force the laminate-side vacuum bed 20 to at least partially conform to the shape of a glass sheet 60 held by a glass-side contoured mold 30 in contact with the mold-receiving side 14 of the glass-side vacuum bed 10, and releasing the vacuum pulled across the laminate-side vacuum bed 20 as the lamination actuator 50 moves laterally relative to the laminate-side vacuum bed.

More specifically, the laminate-side vacuum bed 20 may be sufficiently flexible to at least partially conform to the shape of a glass sheet 60, such as a glass sheet 60 held by the glass-side contoured mold 30 in contact with the mold-receiving side of the glass-side vacuum bed 10. In one embodiment, as depicted in FIG. 2, the lamination actuator 50 rolls across the vacuum backside 22 of the laminate-side vacuum bed 20 with a vertical pressure that pushes the flexible laminate-side vacuum bed 20 towards the glass sheet 60. The laminate-side vacuum bed 20 is temporarily displaced vertically as the lamination actuator 50 moves across the lateral distance of the glass sheet 60.

As the lamination package 40 is contacted with the glass sheet 60, it is secured to the glass sheet 60 and separates from the laminate-side vacuum bed 20, forming a lamination layer on the glass sheet 60. In one embodiment, the lamination actuator 50 may be operative to release the vacuum pulled across the laminate-side vacuum bed 20 as the lamination actuator 50 moves laterally relative to the laminate-side vacuum bed 20. The vacuum system may be operative to control a lateral release of vacuum pulled across the laminate-side vacuum bed 20 along a lateral dimension of the laminate-side vacuum bed 20. The lamination actuator 50 may be operative to complement the lateral controlled release of vacuum pulled across the laminate-side vacuum bed 20 by moving laterally relative to the laminate-side vacuum bed 20 in coordination with the lateral controlled release of vacuum. The lamination actuator 50 may be operative to release, or complement the release of, the vacuum pulled across the laminate-side vacuum bed 20 as the lamination actuator 50 moves laterally relative to the laminate-side vacuum bed 20. In one embodiment, the vacuum pulled across the laminate-side vacuum bed 20 may be released in segments. The segments may be laterally divided areas on the laminate-side vacuum bed 20, such that when the lamination actuator 50 has engaged an entire segment of the laminate-side vacuum bed 20, the vacuum may be released on that segment. As the lamination actuator 50 moves across another adjacent segment, that adjacent segment is subsequently release of vacuum pressure.

For example, in one embodiment, the lamination actuator 50 is pushed with a vertical pressure against the vacuum backside 22 of the laminate-side vacuum bed 20, which cause the lamination package 40 to contact the glass sheet 60 at a certain vertical position. In applying the pressure on the laminate-side vacuum bed 20, the lamination actuator 50 stretches and displaces sections of the laminate-side vacuum bed 20, as seen in FIG. 2. The lamination actuator 50 then moves laterally across the distance of the glass sheet 60, and adjusts its vertical position based on the vertical contour of the glass sheet 60. As the lamination actuator 50 moves across the lateral distance of the glass sheet 60, the vacuum is released on the trailing side of the lamination actuator 50 (depicted as the left side in FIG. 2). The release of vacuum and the contacting of the lamination package 40 with the glass sheet 60 contribute to forming a lamination layer on a surface of the glass sheet 60. As the lamination actuator 50 moves laterally across the distance of the glass sheet 60, at least a part of a surface of the glass sheet 60 is laminated with the lamination package 40.

In one embodiment, the vacuum system that creates the vacuum on the glass-side vacuum bed 10 and/or the vacuum system that creates the vacuum on the laminate-side vacuum bed 20 may create a vacuum pressure of about 25 in Hg. However, it should be understood that the vacuum pressure on the glass-side vacuum bed 10 need only be enough to maintain the position of the glass sheet 60 and the vacuum pressure on the laminate-side vacuum bed 20 need only be enough to maintain the position of the lamination package 40. For example, the vacuum pressure required to maintain the position of the glass sheet may be greater than or less than 25 in Hg, and may depend upon the physical properties of the glass sheet, such as, but not limited to, the size, thickness, weight and/or composition of the glass sheet. Similarly, the vacuum pressure required to maintain the position of the lamination package 40 may be greater than or less than 25 in Hg, and may depend upon the physical properties of the lamination package 40, such as, but not limited to, the size, thickness, weight and/or composition of the lamination package 40. The vacuum pressure applied to the glass-side vacuum bed 10 and/or laminate-side vacuum bed 20 may also depend upon the physical properties of the glass-side vacuum bed 10 and/or laminate-side vacuum bed 20, such as the size, thickness, permeability, and/or composition of the glass-side vacuum bed 10 and/or laminate-side vacuum bed 20. It should further be understood that different vacuum pressures may be present on the glass-side vacuum bed 10 and the laminate-side vacuum bed 20, or in some embodiments there may be no vacuum pressure on one or both of the glass-side vacuum bed 10 and laminate-side vacuum bed 20. In some embodiments, the vacuum pressure on the glass-side vacuum bed 10 and/or the laminate-side vacuum bed 20 may be between about 0 (or no vacuum) in Hg and about 30 in Hg. In one embodiment, the vacuum pressure on the glass-side vacuum bed 10 and/or the laminate-side vacuum bed 20 may be between about 15 in Hg and about 30 in Hg.

The vacuum on the laminate-side vacuum bed 20 may be released completely, or may alternatively be released only partially, so that a vacuum pressure remains after the release, such as a vacuum pressure that is less than the vacuum pressure in the non-released state. The release of vacuum may occur over a period of time, or may occur substantially instantaneously. In another embodiment, the vacuum may be released and reversed, such that an opposite vacuum pressure is applied to the laminate-side vacuum bed 20, which may push the lamination package 40 out of contact with the laminate-side vacuum bed 20, or at least reduce the friction between the lamination package 40 and the laminate-side vacuum bed 20.

Figure 3:
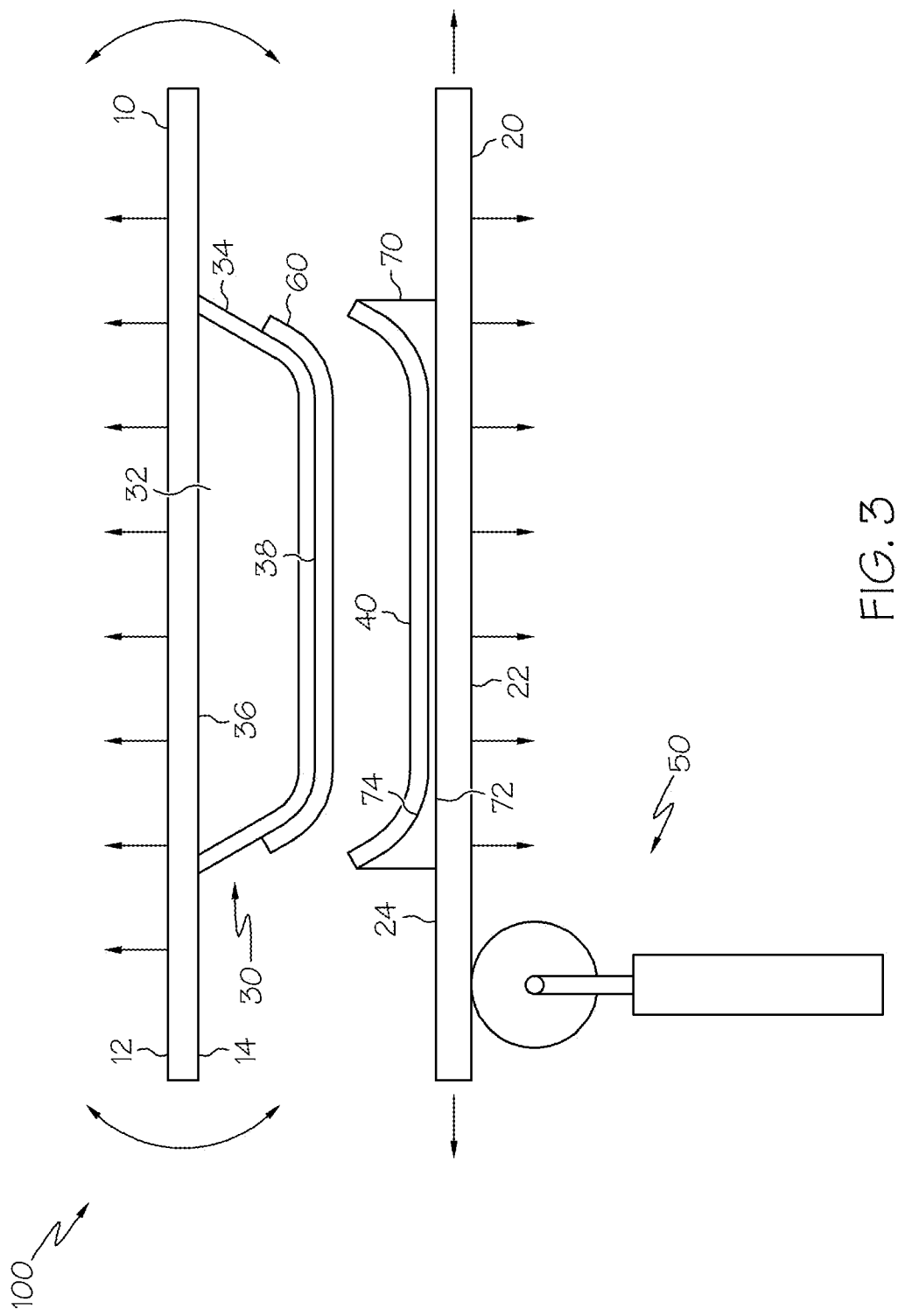
FIG. 3 is a schematic cross section illustrating a glass sheet laminating system comprising a laminate-side mold.

Now referring to FIG. 3, in another embodiment, the glass sheet laminating system 100 may comprise a laminate-side mold 70. The laminate-side mold 70 may comprise a bed-receiving surface 72 and a laminate-receiving surface 74. The laminate-side mold 70 may be positioned between the lamination package 40 and a laminate-side vacuum bed 20, wherein the bed-receiving surface 72 contacts the laminate-side vacuum bed 20 and the laminate-receiving surface 74 contacts the lamination package 40. The laminate-receiving surface 74 of the laminate-side mold 70 may be shaped to complement the shape of the glass sheet 60, such as a bezeled-edge glass sheet or beveled-edge glass sheet.

The laminate-side mold 70 may comprise an elastomer material, plastic material, or combinations and/or suitable composite materials thereof. The laminate-side mold 70 may be permeable, such as comprising a micro-porous material. The laminate-side mold 70 may be only partially permeable, such that some sections of the laminate-side mold 70 are permeable and other sections are not, or alternatively may have sections that are more permeable than other sections. The laminate-side mold 70 may be compliant and may be substantially flexible, such that the bed-receiving surface 72 may substantially adopt the shape of the laminate-side vacuum bed 20. In other embodiments, the laminate-side mold 70 may be substantially non-compliant and/or non-flexible, and may be non-permeable.

Still referring to FIG. 3, the lamination package 40 may be held in contact with the laminate-side mold 70, which is held in contact with the laminate-side vacuum bed 20 through vacuum pressure. The laminate-side mold 70 may be held in contact with the laminate-side vacuum bed 20 by pulling a vacuum across the thickness of the laminate-side mold 70 between the vacuum backside 22 and the mold-receiving side 24 of the laminate-side vacuum bed 20. A lamination package 40 may be held in contact with the laminate-receiving surface 74 of the laminate-side mold 70 by vacuum pressure that is transferred through the micro-porous material of the laminate-side mold 70.

Although the embodiments in FIGS. 1-3 depict a laminate-side vacuum bed 20, wherein a vacuum is pulled across the thickness of the bed, a laminate-side bed without vacuum functionality may be present in some embodiments. Such a bed without vacuum functionality may be permeable or impermeable, as no gases need to pass through the bed to form the vacuum pressure gradient. For example, the laminate-side mold 70 may rest on a laminate-side bed 20 and the lamination package 40 may rest on the laminate-side mold 70, wherein no vacuum pressure is applied. The relative positioning of the laminate-side bed, laminate-side mold 70, and lamination package 40 may be maintained through gravitational forces and frictional forces.

In one embodiment, the glass sheet 60 is substantially aligned with the lamination package 40, and the lamination actuator 50 is operative to move the laminate-side vacuum bed 20 vertically relative to the glass-side vacuum bed 10. The lamination actuator 50 may apply a substantially vertical force to push the lamination package 40 into contact with the glass sheet 60. For example, the glass sheet 60 may be substantially aligned with the lamination package 40 when the glass sheet 60 is substantially flat and the lamination package 40 is positioned relatively flat. Alternatively the curved glass sheet 60 may be substantially aligned with the lamination package 40 when the lamination package 40 is contacted by a laminate-side mold 70, wherein the laminate-receiving surface 74 of the laminate-side mold 70 has a shape that is complementary to the shape of the glass sheet 60 that is curved. In some embodiments, the contact of the lamination package 40 with the glass sheet 60 is sufficient for lamination. For example, the lamination package 40 may be held under vacuum pressure until it is contacted with the glass sheet 60, at which time the vacuum pressure may be released and the laminate-side mold 70 thereafter releases the lamination package 40, which maintains contact with the glass sheet 60. Alternatively, no vacuum pressure may be applied to the lamination package 40 to maintain its position relative the laminate-side mold 70 and laminate-side vacuum bed 20.

In another embodiment, the lamination actuator 50 may be operative to move the laminate-side vacuum bed 20 vertically relative to the glass-side vacuum bed 10 so that the lamination package 40 and the glass sheet 60 are aligned and in contact or in near contact with one another. The lamination actuator 50 may further be operatively to engage the vacuum backside 22 of the laminate-side vacuum bed 20 and move laterally across the length of the laminate-side vacuum bed 20. For example, the glass sheet 60 and lamination package 40 may be positioned near one another and in alignment relative to one another, and a roller may move laterally across the length of the laminate-side vacuum bed 20 while applying a vertical pressure on the laminate-side vacuum bed 20. The vertical pressure from the roller as it moves laterally across the laminate-side vacuum bed 20 may contact the glass sheet 60 with the lamination package 40 and cause a release of the lamination package 40 from the laminate-side mold 70. In this embodiment, the vacuum system may be operative to control a lateral release of vacuum pulled across the laminate-side vacuum bed 20 along a lateral dimension of the laminate-side vacuum bed 20. The lamination actuator 50 may be operative to complement the lateral controlled release of vacuum pulled across the laminate-side vacuum bed 20 by moving laterally relative to the laminate-side vacuum bed 20 in coordination with the lateral controlled release of vacuum. The lamination actuator 50 may be operative to release, or complement the release of, the vacuum pulled across the laminate-side vacuum bed 20 as the lamination actuator 50 moves laterally relative to the laminate-side vacuum bed 20.

It should be understood that the systems described herein may include temperature controls for the glass-side vacuum bed 10, the laminate-side vacuum bed 20, or both the glass-side vacuum bed 10 and laminate-side vacuum bed 20. The lamination systems described herein may comprise hot or cold lamination.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various embodiments described herein. Further, it will be apparent that modifications and variations are possible without departing from the scope of the appended claims. More specifically, although some aspects of the present disclosure are identified herein as preferred or particularly advantageous, it is contemplated that the present disclosure is not necessarily limited to these aspects.

The invention claimed is:

1. A contoured glass sheet laminating system comprising a glass-side vacuum bed, a laminate-side vacuum bed and a lamination actuator wherein:
   the glass-side vacuum bed comprises a vacuum backside and a mold-receiving side and has sufficient permeability to permit a vacuum system to pull a vacuum across a thickness of the glass-side vacuum bed between the vacuum backside and the mold-receiving side of the glass-side vacuum bed;
   the laminate-side vacuum bed comprises a vacuum backside and a thin-film loading side and has sufficient permeability to permit a vacuum system to pull a vacuum across a thickness of the laminate-side vacuum bed between the vacuum backside of the laminate-side vacuum bed and the thin-film loading side of the laminate-side vacuum bed;
   the lamination actuator is positioned to operatively engage the vacuum backside of the laminate-side vacuum bed and is operative to move laterally and vertically relative to the glass-side vacuum bed and the laminate-side vacuum bed;
   the laminate-side vacuum bed is sufficiently flexible to at least partially conform to the shape of a contoured glass sheet held by a glass-side contoured mold in contact with the mold-receiving side of the glass-side vacuum bed when loaded with a thin-film lamination package and operatively engaged by the lamination actuator; and
   the lamination actuator is further operative to complement an at least partial release of the vacuum pulled across the laminate-side vacuum bed as the lamination actuator moves laterally relative to the laminate-side vacuum bed, wherein the glass-side vacuum bed is under lateral tension.

2. The contoured glass sheet laminating system of claim 1, wherein the laminating system further comprises the glass-side contoured mold on the mold-receiving side of the glass-side vacuum bed.

3. The contoured glass sheet laminating system of claim 2, wherein a glass-receiving surface of the glass-side contoured mold is configured to complement the shape of the contoured glass sheet.

4. The contoured glass sheet laminating system of claim 2, wherein the glass-side contoured mold comprises:
   a mold body in contact with the glass-side vacuum bed; and
   an elastomeric sheath comprising an elastomeric sheath material that covers the mold body, wherein the mold body comprises a material that is harder than the material of the elastomeric sheath.

5. The contoured glass sheet laminating system of claim 4, wherein the elastomeric sheath comprises a micro-porous material with higher compressible response than the material of the mold body.

6. The contoured glass sheet laminating system of claim 1, wherein the glass-side vacuum bed is mounted to a pivoting frame that is configured to enable the glass-side vacuum bed to be flipped about a lateral axis of the glass-side vacuum bed.

7. The contoured glass sheet laminating system of claim 1, wherein:
   the vacuum system is operative to control a lateral release of at least some of the vacuum pulled across the laminate-side vacuum bed along a lateral dimension of the laminate-side vacuum bed; and
   the lamination actuator is operative to complement the lateral controlled release of at least some of the vacuum pulled across the laminate-side vacuum bed by moving laterally relative to the laminate-side vacuum bed in coordination with the lateral controlled release of at least some of the vacuum.

8. The contoured glass sheet laminating system of claim 1, wherein the laminating system further comprises a flexible thin-film lamination package on the thin-film loading side of the laminate-side vacuum bed.

9. The contoured glass sheet laminating system of claim 8, wherein the flexible thin-film lamination package comprises an optical polymer film, a pressure sensitive adhesive, an optical enhancing material, or combinations thereof.

10. The contoured glass sheet laminating system of claim 9, wherein the optical polymer film comprises at least one of PET film, TAC film, and a polycarbonate film.

11. The contoured glass sheet laminating system of claim 9, wherein the optical enhancing material comprises at least one of an anti-reflective layer, an anti-glare layer, a protective layer, a touch functional layer, an electronic functionalized layer, or combinations thereof.

12. The contoured glass sheet laminating system of claim 8, wherein the flexible thin-film lamination package comprises an electrically conductive layer.

13. The contoured glass sheet laminating system of claim 8, wherein the laminating system further comprises a radial adjustment unit configured to place the laminate-side vacuum bed, and the thin-film lamination package positioned thereon, under lateral tension.

14. The contoured glass sheet laminating system of claim 1, wherein the glass-side vacuum bed is held under lateral tension by a radial adjustment unit.

15. The contoured glass sheet laminating system of claim 1, wherein the glass-side vacuum bed comprises a micro-porous cellular material.

16. The contoured glass sheet laminating system of claim 1, wherein the laminate-side vacuum bed is under lateral tension.

17. The contoured glass sheet laminating system of claim 1, wherein the laminate-side vacuum bed comprises a micro-porous cellular material.

18. A sheet laminating system comprising an object-side vacuum bed, a laminate-side vacuum bed and a lamination actuator wherein:
   the object-side vacuum bed comprises a vacuum backside and a mold-receiving side and has sufficient permeability to permit a vacuum system to pull a vacuum across a thickness of the object-side vacuum bed between the vacuum backside and the mold-receiving side of the object-side vacuum bed;
   the laminate-side vacuum bed comprises a vacuum backside and a thin-film loading side and has sufficient permeability to permit a vacuum system to pull a vacuum across a thickness of the laminate-side vacuum bed between the vacuum backside of the laminate-side vacuum bed and the thin-film loading side of the laminate-side vacuum bed;
   the lamination actuator is positioned to operatively engage the vacuum backside of the laminate-side vacuum bed and is operative to move laterally and vertically relative to the object-side vacuum bed and the laminate-side vacuum bed;
   the laminate-side vacuum bed is sufficiently flexible to at least partially conform to the shape of a sheet held by a mold in contact with the mold-receiving side of the object-side vacuum bed when loaded with a thin-film lamination package and operatively engaged by the lamination actuator; and
   the lamination actuator is further operative to complement the release of the vacuum pulled across the laminate-side vacuum bed as the lamination actuator moves laterally relative to the laminate-side vacuum bed, wherein the glass-side vacuum bed is under lateral tension.

19. A contoured glass sheet laminating system comprising a glass-side vacuum bed, a laminate-side bed, a glass-side contoured mold, a laminate-side compliant mold, and a lamination actuator wherein:
   the glass-side vacuum bed comprises a vacuum backside and a mold-receiving side and has sufficient permeability to permit a vacuum system to pull a vacuum across a thickness of the glass-side vacuum bed between the vacuum backside and the mold-receiving side of the glass-side vacuum bed;
   the laminate-side bed comprises a backside and a thin-film loading side;
   the lamination actuator is operative to move the laminate-side bed vertically relative to the glass-side vacuum bed; and
   the glass-side contoured mold is positioned on the mold-receiving side of the glass-side vacuum bed, wherein the glass-side vacuum bed is under lateral tension.

20. The contoured glass sheet laminating system of claim 19, wherein the laminate-side bed is a vacuum bed and has sufficient permeability to permit a vacuum system to pull a vacuum across a thickness of the laminate-side bed between the backside and the thin-film loading side of the of the laminate-side bed.

21. The contoured glass sheet laminating system of claim 19, wherein the lamination actuator is further operative to move laterally relative to the glass-side vacuum bed and a laminate-side vacuum bed.

22. The contoured glass sheet laminating system of claim 21, wherein the lamination actuator is further operative to complement the release of the vacuum pulled across the laminate-side bed as the lamination actuator moves laterally relative to the laminate-side vacuum bed.

* * * * *